(12) United States Patent
Lutz

(10) Patent No.: US 11,161,548 B2
(45) Date of Patent: Nov. 2, 2021

(54) CHASSIS FOR A VEHICLE

(71) Applicant: luvly AB, Johanneshov (SE)

(72) Inventor: Håkan Glanton Lutz, Joanneshov (SE)

(73) Assignee: LUVLY AB, Johanneshov (SE)

( * ) Notice: Subject to any disclaimer, the term of this patent is extended or adjusted under 35 U.S.C. 154(b) by 139 days.

(21) Appl. No.: 16/348,223

(22) PCT Filed: Nov. 8, 2017

(86) PCT No.: PCT/EP2017/078594
§ 371 (c)(1),
(2) Date: May 8, 2019

(87) PCT Pub. No.: WO2018/087142
PCT Pub. Date: May 17, 2018

(65) Prior Publication Data
US 2019/0329823 A1 Oct. 31, 2019

(30) Foreign Application Priority Data
Nov. 9, 2016 (SE) .................................... 1600313-9

(51) Int. Cl.
*B62D 21/10* (2006.01)
*B62D 29/00* (2006.01)
(Continued)

(52) U.S. Cl.
CPC ........... *B62D 21/10* (2013.01); *B62D 23/005* (2013.01); *B62D 27/026* (2013.01);
(Continued)

(58) Field of Classification Search
CPC .... B62D 29/046; B62D 23/005; B62D 23/00; B62D 21/10
See application file for complete search history.

(56) References Cited

U.S. PATENT DOCUMENTS

| 5,042,395 A * | 8/1991 | Wackerle | B61D 17/045 |
| | | | 105/397 |
| 5,320,403 A * | 6/1994 | Kazyak | B62D 23/005 |
| | | | 296/203.01 |

(Continued)

FOREIGN PATENT DOCUMENTS

| DE | 102012213469 B3 | 11/2013 | |
| DE | 102013105987 A1 * | 12/2013 | ......... B62D 25/2054 |

(Continued)

OTHER PUBLICATIONS

Machine Translation of EP3109123A1, printed from the EPO website, Nov. 19, 2020.*

(Continued)

*Primary Examiner* — Jason S Morrow
(74) *Attorney, Agent, or Firm* — Kagan Binder, PLLC

(57) ABSTRACT

The present disclosure relates to a chassis (300) for a vehicle, the chassis (300) comprising a plurality of sandwich plate elements (100) and a plurality of connection elements (200), wherein the sandwich plate elements (100) each comprise a plate core (150) and a first and second plate skin (110, 120) and wherein each connection element (200) comprises two or more recesses (210, 220), each recess (210, 220) being adapted to receive an edge portion (160) of one of the plurality of sandwich plate elements (100) such that at least a portion of the sandwich plate element (100) interacts with the recess (210, 220), thereby connecting said plurality of sandwich plate elements (100) to form said chassis (300). The disclosure also relates to a vehicle comprising a chassis (300), a method for forming a chassis (300) and a kit of parts for assembling a chassis (300).

17 Claims, 12 Drawing Sheets

(51) Int. Cl.
   *B62D 29/04*   (2006.01)
   *B62D 65/02*   (2006.01)
   *B62D 23/00*   (2006.01)
   *B62D 27/02*   (2006.01)

(52) U.S. Cl.
   CPC ......... *B62D 29/008* (2013.01); *B62D 29/046* (2013.01); *B62D 29/048* (2013.01); *B62D 65/024* (2013.01)

(56) References Cited

U.S. PATENT DOCUMENTS

| | | | | |
|---|---|---|---|---|
| 6,237,989 | B1 * | 5/2001 | Ammerlaan | B62D 29/046 |
| | | | | 105/397 |
| 9,567,013 | B2 * | 2/2017 | Ehrlich | B60R 13/08 |
| 2008/0044630 | A1 * | 2/2008 | Lusk | B62D 25/20 |
| | | | | 428/172 |
| 2013/0313862 | A1 * | 11/2013 | Yamaji | B62D 25/2036 |
| | | | | 296/203.01 |
| 2015/0158532 | A1 * | 6/2015 | Ayuzawa | B62D 25/2027 |
| | | | | 296/193.07 |
| 2017/0240215 | A1 * | 8/2017 | LaRose | B62D 31/025 |
| 2018/0118265 | A1 * | 5/2018 | Gallier | B62D 29/002 |
| 2019/0283810 | A1 * | 9/2019 | Nothdurfter | B62D 29/046 |
| 2020/0039586 | A1 * | 2/2020 | Ayuzawa | B62D 27/065 |
| 2020/0108876 | A1 * | 4/2020 | Wang | B62D 33/044 |

FOREIGN PATENT DOCUMENTS

| | | | | |
|---|---|---|---|---|
| DE | 202016003447 | U1 * | 8/2016 | ............ B62D 33/04 |
| EP | 0523831 | A1 | 1/1993 | |
| EP | 2327609 | A2 | 6/2011 | |
| EP | 3109123 | A1 | 12/2016 | |
| WO | 2016156746 | A1 | 10/2016 | |
| WO | WO-03/045767 | * | 11/2020 | ........... B62D 23/005 |

OTHER PUBLICATIONS

International Search Report for International Application No. PCT/EP2017/078594, dated Feb. 13, 2018 (8 pages).
E-spacenet English Abstract of WO 2016156746.
E-spacenet English Abstract of DE 102012213469.
E-spacenet English Abstract of EP 3109123.

* cited by examiner

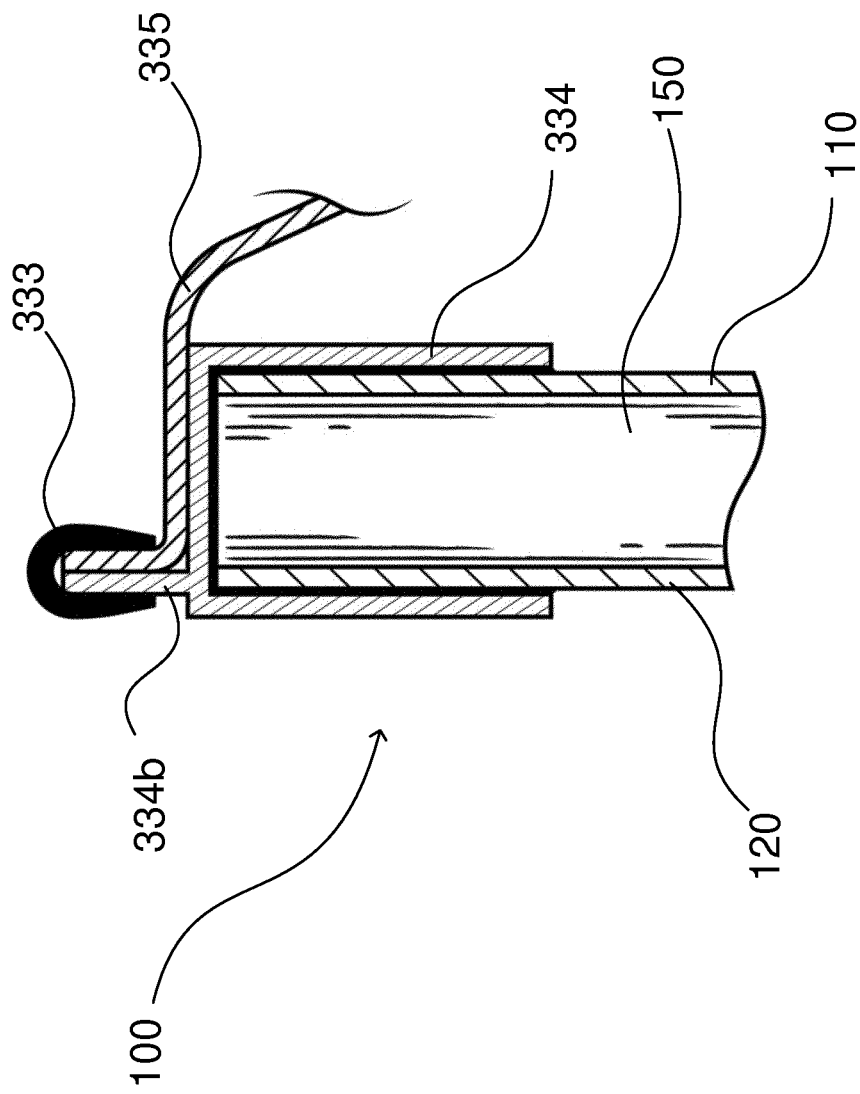

CHASSIS FOR A VEHICLE

CROSS-REFERENCE TO RELATED APPLICATIONS

This application claims priority to International Application No. PCT/EP2017/078594, filed Nov. 8, 2017 and titled "CHASSIS FOR A VEHICLE," which in turn claims priority from a Swedish Application having serial number 1600313-9, filed Nov. 9, 2016, and titled "CHASSIS FOR A VEHICLE," both of which are incorporated herein by reference in their entireties.

FIELD OF INVENTION

The present disclosure relates to a chassis for a vehicle. It also relates to a vehicle comprising a chassis, a method for forming a chassis and a kit of parts for assembling a chassis for a vehicle.

TECHNICAL BACKGROUND

Within the field of vehicle construction, vehicles are universally built around chassis. The chassis distributes tensile and compressive forces throughout itself, contributing to the vehicle's stiffness and torsional stiffness. Very rigid chassis can be formed as monocoque chassis—the name implies that they are formed as "one body". Such chassis generally exhibit excellent stiffness characteristics, and thus high safety for passengers or goods as well as good handling characteristics. One drawback with monocoque chassis is that they are expensive and difficult to manufacture. Further, as the name implies, they must be formed as a single entity, which make them difficult to transport and handle. Furthermore, expensive and complicated tools are commonly necessary to form monocoque chassis. Instead of a monocoque chassis, a chassis may be constructed by producing a frame which handles the tensile and compressive forces. The frame is thereafter typically "skinned" with a body. This is commonly referred to as a "body-on-frame" construction. Though the body may sometimes be called a "unibody" in the automotive industry, the body handles little of the forces on the vehicle from the road or wheels and is thus not comparable with a monocoque chassis. Moreover, there are several disadvantages with frame-based chassis. As they are constructed with joints, the joints must be very stiff and thus often times heavy. Joints may also reduce the stiffness of the chassis. The inefficient transfer of forces means that other members of the frame may also need to be thick and/or heavy, giving less space inside the vehicles for passengers or goods. Also, the inefficient transfer of forces means that a "body-on-frame" chassis may be more easily broken apart in the event of an accident, endangering passengers. Therefore, there exists a need for a more efficient chassis.

SUMMARY OF INVENTION

It is an object of the present disclosure to at least mitigate some of the above problems.

According to a first aspect, this and other objects are achieved by a chassis for a vehicle, the chassis comprising a plurality of sandwich plate elements and a plurality of connection elements, wherein the sandwich plate elements each comprise a plate core and a first and second plate skin, wherein the first plate skin is arranged to at least partly cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being opposite to each other, and wherein each connection element comprises two or more recesses, each recess comprising a first and a second inner surface and being adapted to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess, thereby connecting said plurality of sandwich plate elements to form said chassis.

The first and second inner surface of each recess interacting with the sandwich plate elements enables a rigid construction with an efficient transfer of forces. This allows for construction or formation of a chassis with a high degree of safety and good vehicle handling characteristics. At the same time, it is possible to transport and/or handle the chassis in its disassembled state. The parts of the chassis may be formed more cheaply and with simpler tools as compared to when forming a whole chassis, such as a monocoque chassis, while still maintaining good stiffness characteristics.

The edge portions received in the recesses may be bonded to the first and second inner surfaces of each of said recesses by an adhesive. This provides for a way to attach the sandwich plate elements to the connection elements without for example making holes, which may compromise the rigidity of the chassis, or make unnecessary additions to the sandwich plate elements or connection elements. In other words, by bonding the edge portions of the sandwich plate elements to the inner surfaces of the respective recesses the mechanical properties of the sandwich plate elements and the connection elements may be less affected as compared to when mechanical fastening techniques are used.

The first and second major outer surfaces of the sandwich plate elements may be at least partially parallel. Having at least the edge portions of the sandwich plate elements received in the connection elements be parallel may make the construction stronger, as tensions in the plate elements as a result of bending of said plate elements may be distributed in the skin of the sandwich plate elements.

The chassis may further comprise auxiliary elements, said auxiliary elements being connected to the connection elements of the chassis. This has the advantage of enabling the chassis to include features increasing the safety, handling or other features of the chassis. Examples of such auxiliary elements may be wheel suspensions, fuel tanks, lights, engine mounts or other elements necessary for the functionality of a vehicle.

The chassis may further comprise energy absorption elements. Such energy absorption elements may increase safety for passengers in a vehicle comprising the chassis as they may at least partly absorb the energy of an impact from a collision.

The energy absorption elements may be arranged at least partially at a front and/or a back of the chassis. They may then absorb energy from frontal and rear vehicle collisions. As an example, this may prevent whiplash injuries or other severe injury types.

The energy absorption elements may be arranged at least partially at a left and/or a right side of the chassis. This may provide protection from vehicle collisions for example when crossing a road lane.

By the term "front side" is meant a side facing the direction a vehicle would typically travel under normal operation, and by the term "back side" is meant a side opposite the front side. By the term "left side" is meant the side to the left of a person who is facing in the normal direction of travel of the vehicle and is inside the vehicle. By the term "right side" is meant the side to the right of a person who is facing in the normal direction of travel of the vehicle and is inside the vehicle.

The first and second plate skin of a sandwich plate element may be made from a fibre-reinforced polymer material. Such materials are well-known for being light-weight and strong.

The plate core of a sandwich plate element may be made from a polymeric foam. Polymeric foam may absorb impacts and may be light-weight. The plate core may increase the thickness of the sandwich plate element thereby increasing bending stiffness while only marginally increasing the weight of the sandwich plate element.

Moreover, the use of a polymeric foam core may facilitate the forming of the sandwich plate elements by shaping the polymeric foam into a desired shape and subsequently forming the plate skins on the formed core. In other words, the core may be formed into a desired shape and the skins may be laminated on the core such that the skins follow an external contour of the core.

A connection element may be made from metal. Metal is widely available, strong and may be easy to manufacture parts from. A connection element may be made from a polymer-based material. Polymer-based materials are cheap to manufacture, strong and may be easy to shape. Both connection elements made of metal and polymer based materials may suitably be formed by 3d printing techniques. Examples may include fiber-reinforced plastic.

A connection element may be made by an extrusion process. By such a process it is possible to more easily form a strong connection element which may have a complicated cross-section.

According to a second aspect, the present disclosure relates to a vehicle comprising a chassis of the above type.

According to a third aspect, the present disclosure relates to a method for forming a chassis for a vehicle, comprising the steps of:

providing a plurality of sandwich plate elements, each plate element comprising a plate core and a first and second plate skin, wherein the first plate skin is arranged to at least partly cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being opposite to each other; providing a plurality of connection elements, each connection element comprising two or more recesses, each recess comprising a first and a second inner surface and being adapted to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess; and arranging an edge portion of each of the plurality of sandwich plate elements into a recess of one of the plurality of connection elements, thereby forming said chassis.

Forming or constructing a chassis in this way may be easier and more cost-efficient than constructing a monocoque, while still enabling some of the advantages of a monocoque chassis. It should be noted that the inventive method may incorporate any of the features described above in association with the inventive chassis, and has the same corresponding advantages.

According to a fourth aspect, the present disclosure relates to a kit of parts for assembling a chassis for a vehicle, the kit comprising a plurality of sandwich plate elements and a plurality of connection elements, wherein the sandwich plate elements each comprise a plate core and a first and second plate skin, wherein the first plate skin is arranged to at least partially cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being at least partially opposite to each other, and wherein each connection element comprises two or more recesses, each recess comprising a first and a second inner surface and being adapted to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess.

Preferred variants of the inventive concept appear in the dependent claims and in the description.

The chassis may be for a vehicle, in particular a road vehicle, and may comprise or substantially consist of: a) panels of composite polymer material comprising a core of polymer foam to the outer faces of which sheets of non-foamy polymer are attached by adhesive means; b) extruded metal and/or rigid polymer profile elements; wherein the panels are mounted to each other by said extruded profile elements; and wherein one or more metal or polymer profile elements comprise means for mounting of gear not pertaining to the chassis; wherein a profile element comprises two panel mounting slits and wherein a panel mounting slit is defined by two flanges extending in parallel from a central portion of the profile element.

The chassis may comprise a means selected from longitudinally extending gear mounting slit, longitudinally extending gear mounting channel, transversely extending bore optionally threaded, gluing surface, for mounting gear not pertaining to the chassis such as motor block, wheels, steering mechanism, fuel tank, driver's seat, passengers seat.

The chassis may comprise a bottom panel of substantially greater thickness than that of the other panels.

The bottom panel may have a thickness of from about 5 cm or 6 cm to about 15 cm, more preferred of from about 8 cm to about 12 cm, most preferred of about 10 cm.

A panel may comprise two or more outer and zero or more inner layers of stiff polymer foam, adjacent layers of stiff polymer foam may be interspaced by a non-foamy polymer layer, and sheets of non-foamy polymer may be attached to the free faces of the outer stiff polymer foam layers by adhesive means.

A layer or sheet of non-foamy polymer may be reinforced by fibre. Said fibre may be selected from glass fibre, cellulose fibre, polymer fibre, carbon fibre, metal fibre.

A panel other than the bottom panel may have a thickness of from about 2.5 cm to about 5 cm.

An extruded metal profile may be of aluminium or an aluminium alloy.

An extruded metal profile may be of steel.

A rigid extruded polymer profile may be fibre-reinforced.

The chassis may further comprise an energy absorbing element attached to an outer face of a panel other than the bottom panel. Said energy absorbing element may be attached by adhesive means.

The energy absorbing element may comprise or substantially consist of stiff, high density polymer foam.

A face of a mounted energy absorbing element may be provided with an abrasion resistive, optionally coloured or painted polymer layer. The layer may be a coloured polyurethane layer.

A method of manufacture of the chassis may comprise providing a bottom panel, a panel other than the bottom panel, a profile element comprising two U-formed slits of different width, one corresponding to the thickness of the bottom panel, the other corresponding to the thickness of the other panel; connecting the bottom panel and the other panel by inserting an edge of the bottom panel in one slit and an edge of the other panel edge in the other slit; securing the bottom panel and the other panel in the slits by adhesive.

The method may further comprise connecting two other panels to each other by means of a profile element comprising two U-formed slits of a width corresponding to the thickness of the panel to be mounted in the respective slit.

The method may comprise mounting at a profile element of gear not pertaining to the chassis such as motor block, wheels, steering mechanism, fuel tank, driver's seat, passenger's seat via said extruded profile element(s).

The gear not pertaining to the chassis may be exclusively mounted at extruded profile element(s).

BRIEF DESCRIPTION OF THE DRAWINGS

The present inventive concept will by way of example be described in more detail with reference to the appended schematic drawings, in which

FIGS. 6a and 6b illustrate fastening techniques for covering shells forming parts of a body or a body.

DETAILED DESCRIPTION

Figure 1:
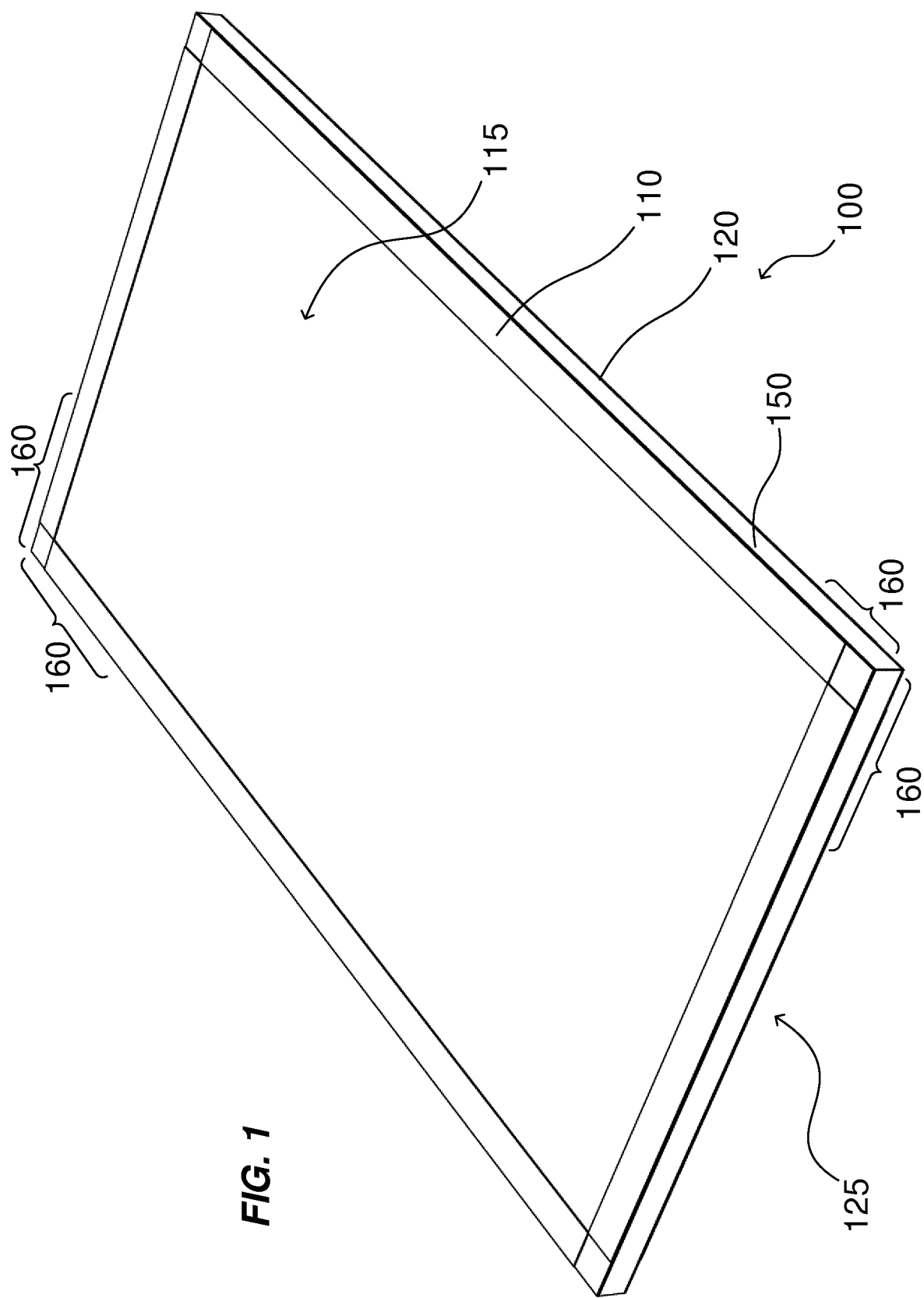
FIG. 1 illustrates a sandwich plate element.

The inventive concept will now be described in more detail with reference to the appended drawings. FIG. 1 illustrates a sandwich plate element 100. The sandwich plate element 100 comprises a plate core 150, a first plate skin 110 and a second plate skin 120. The first and second plate skins 110, 120 are attached to the plate core 150, and cover the plate core 150 as seen along a normal direction of the first or second plate skin 110, 120. The first and second plate skins 110, 120 each have a respective major outer surface 115, 125. The sandwich plate element 100 comprises an edge portion 160 at each of its edges. In the depicted sandwich plate element 100, the plate core 150 is made of polystyrene foam and the first and second plate skins 110, 120 are made of a glass fibre reinforced polyester resin. In other words, the first and second plate skins 110, 120 are made of glass fibres in cured polyester resin. The first and second plate skins 110, 120 are bonded to the plate core 150 using an adhesive. Examples of suitable adhesives are multi-component adhesives such as polyester/polyurethane resin, a polyol/polyurethane resin or an acrylic/polyurethane resin. Other examples may include epoxy, cyanoacrylate or silicone.

As an alternative the plate core 150 may be made of polyurethane, polypropylene, PET or a combination of polyurethane and polystyrene foam. Further, the first and second plate skins 110, 120 may alternatively be made of sheet metal, polymer-based materials, such as acrylic, PET, polypropylene, polycarbonate, acrylonitrile butadiene styrene, polyethylene, polystyrene, polyamide, vinyl ester-based materials, lignin, epoxy or a combination thereof. The first and second plate skins 110, 120 may be reinforced by fibres. Examples of suitable fibres are: flax fibres, thermoplastic fibres, carbon fibres, glass fibres, cotton fibres, hemp fibres, metal fibres and plastic fibres. The first and second plate skins 110, 120 may be made of different materials.

Figure 2:
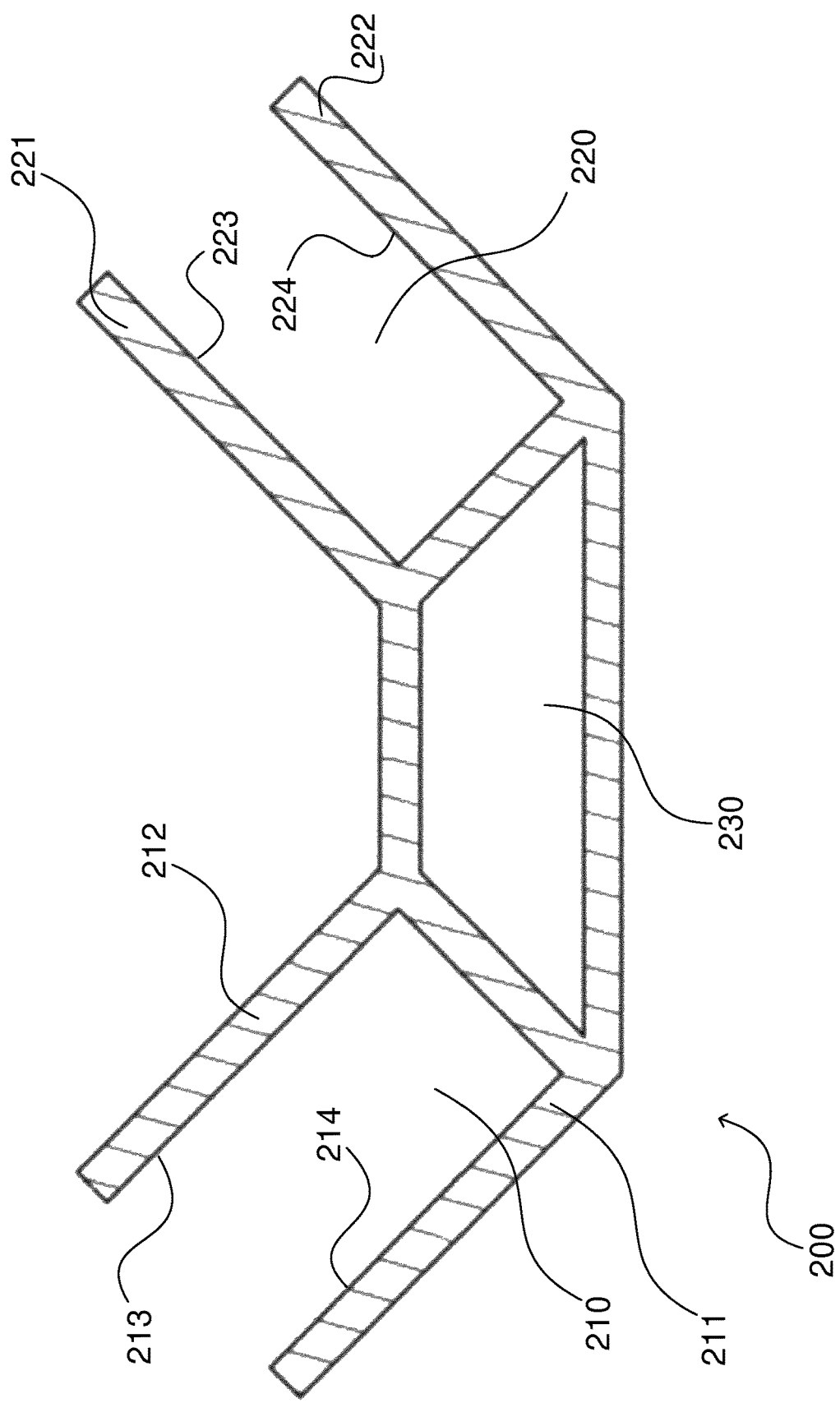
FIG. 2 illustrates a cross-section of a connection element.

FIG. 2 illustrates a connection element 200. The connection element 200 comprises two recesses 210, 220 formed of flanges 211, 212, 221, 222. The recesses 210, 220 are in this case symmetrically formed with respect to each other. Each of the two recesses 210, 220 comprises a first and second inner surface 213, 214, 223, 224. The connection element 200 comprises a central portion 230 having a trapezoid shape. The central portion 230 serves to stabilize the flanges 211, 212, 221, 222 against outer forces and to transfer forces between plate elements 100 received in the connection element 200 or auxiliary elements. The connection element 200 is pictured as having a right angle between the flanges 211 and 221, and between the flanges 212, 222. It is not necessary to have the flanges 211, 212, 221, 222 define a right angle, and the angle may instead be any desired angle depending on the needs. The connection element 200 depicted in FIG. 2 is made of extruded aluminium. As an alternative, the connection element 200 may be made of a different metal such as steel, iron, or a combination thereof.

Other suitable manufacturing techniques such as 3d printing, pultrusion or pullwinding may be used as an alternative to an extrusion process. Moreover, the connection element 200 may be made of polymer based material, such as acrylic, PET, polypropylene, polycarbonate, acrylonitrile butadiene styrene, polyethylene, polystyrene, polyamide vinyl ester-based materials, lignin or epoxy. The polymer based material may advantageously be reinforced by fibres such as flax fibres, thermoplastic fibres, carbon fibres, glass fibres, cotton fibres, hemp fibres, metal fibres, plastic fibres or any other sufficiently strong fibrous material, or a combination thereof.

Figure 3:
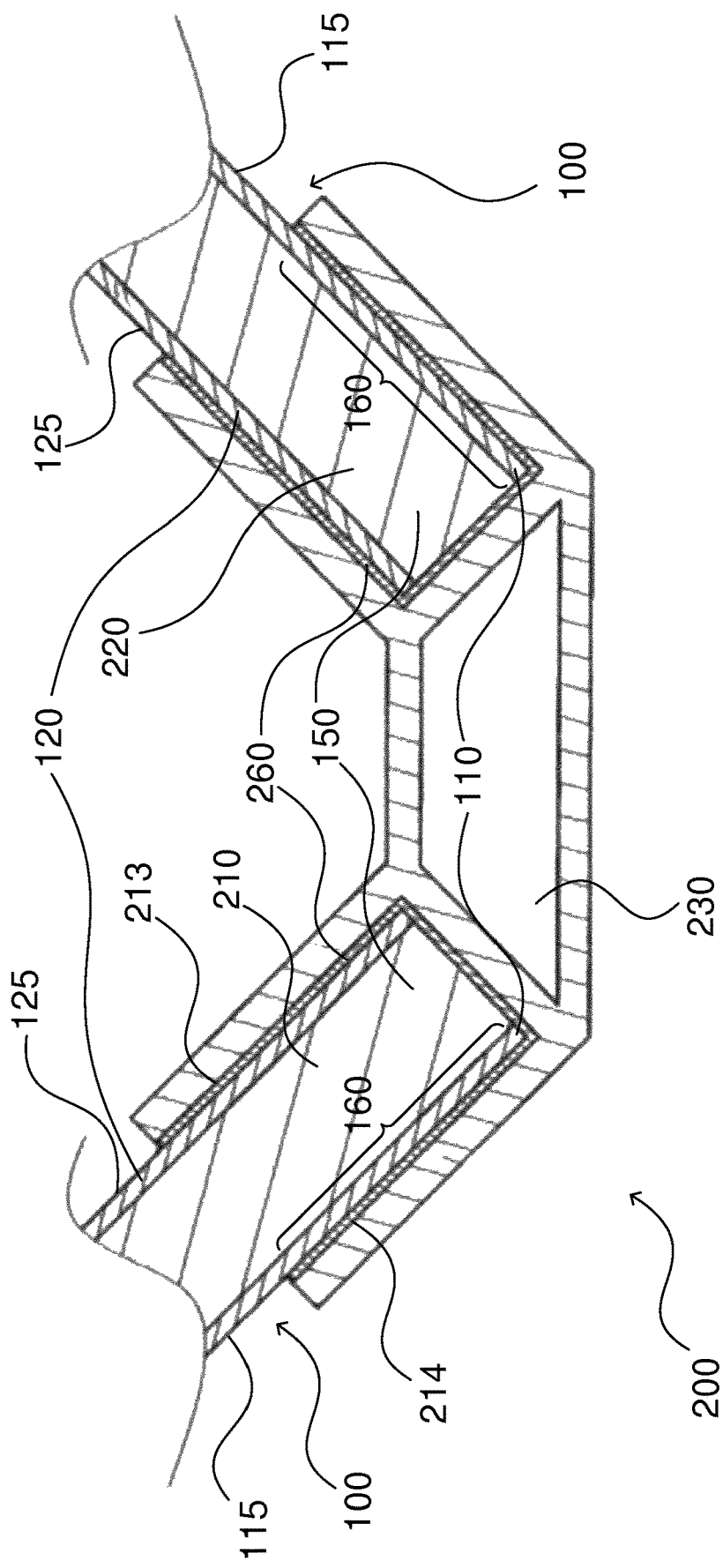
FIG. 3 illustrates a cross-section of a connection element with two mounted sandwich plate elements.

FIG. 3 illustrates a cross-section of the connection element 200 of FIG. 2 with the sandwich plate element 100 being received in the recess 210 of the connection element 200. The first and second inner surface 213, 214 interact with the edge portion 160 of the sandwich plate element 100, counteracting movement of the sandwich plate element 100 in directions normal to the first and second major outer surfaces 115, 125. The first and second inner surface 213, 214 are bonded to the sandwich plate element 100 by an adhesive 260, such as epoxy. The adhesive may be applied to the sandwich plate element 100 before insertion of the sandwich plate element 100 into the recess 210. It may also be applied to the connection element 200 before insertion of the sandwich plate element 100, or it may be applied after insertion of the sandwich plate element 100 into the connection element 200 by way of injection into pre-formed grooves, not shown, on the flanges 211, 212, 221, 222. In FIG. 3, the first and second major outer surfaces 115, 125 are parallel to each other. Further, as shown in FIG. 3, a sandwich plate element 100 has been received in a corresponding manner in recess 220.

Figure 4:
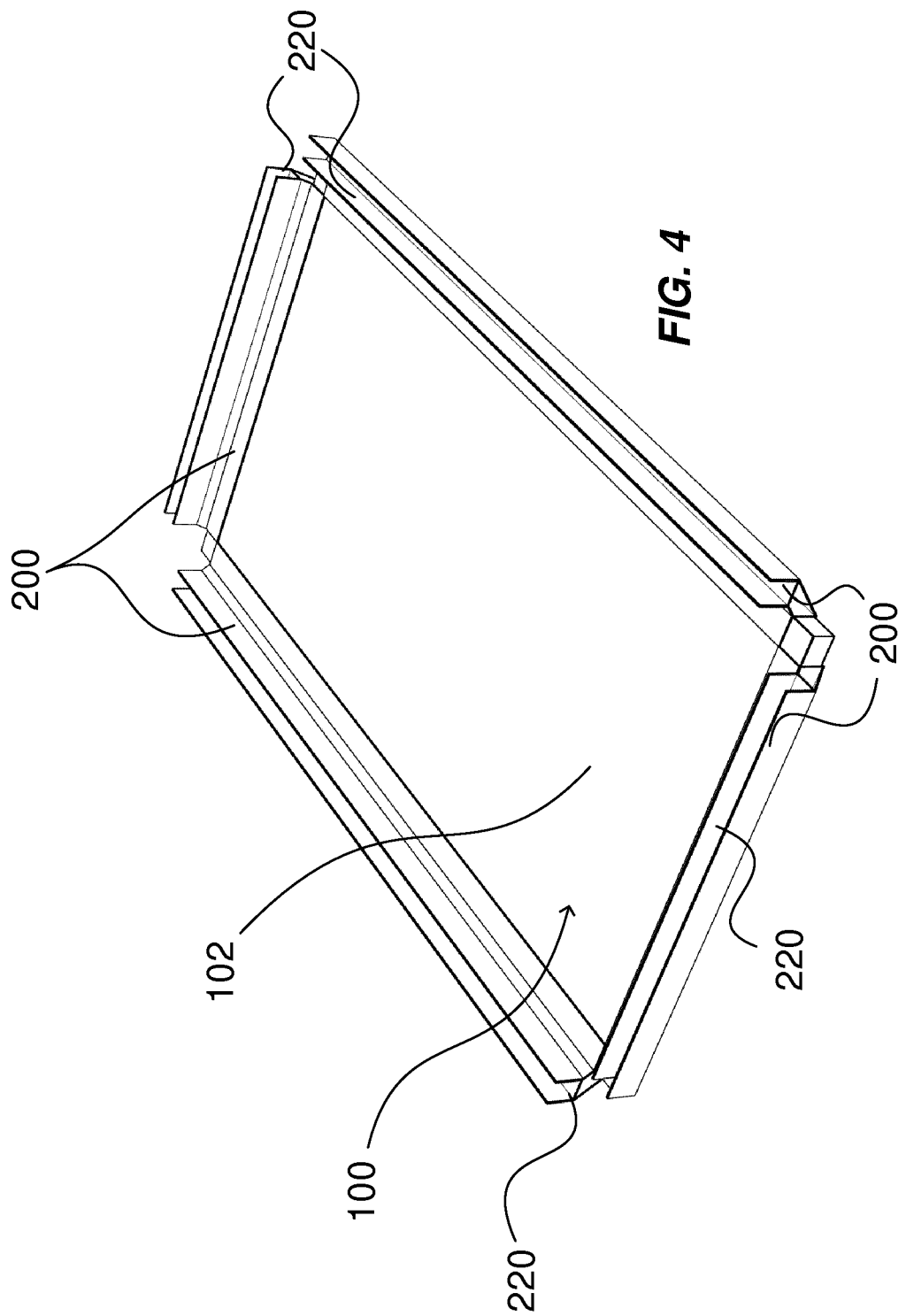
FIG. 4 illustrates a perspective view of a sandwich plate element and connection elements.

FIG. 4 illustrates the sandwich plate element 100 being received in connection elements 200 to form a floor 102 of a chassis.

Figure 5:
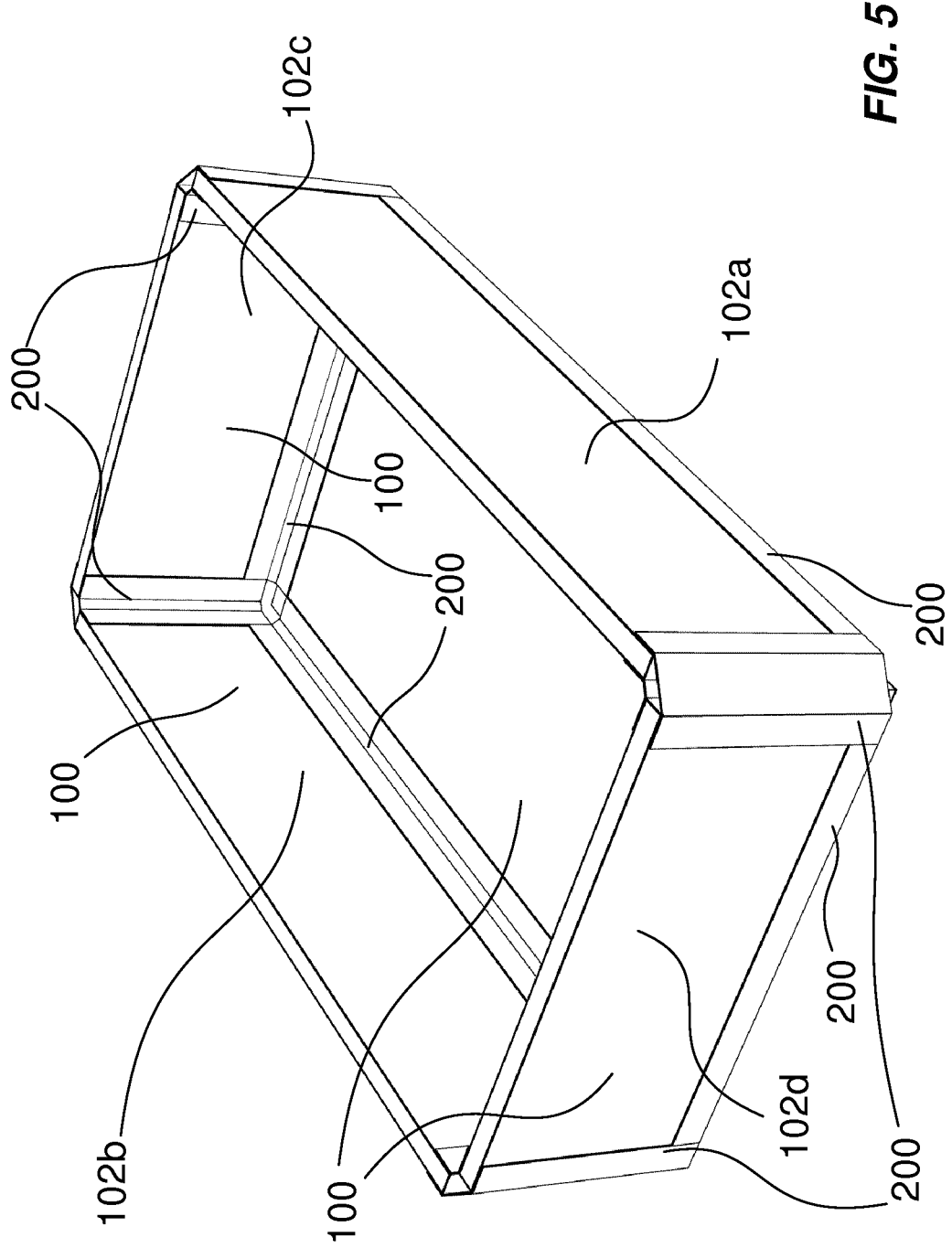
FIG. 5 illustrates a perspective view of several sandwich plate elements connected by connection elements.

FIG. 5 illustrates further sandwich plate elements 100 and connection elements 200 being connected in a similar way to form walls 102a, 102b, 102c, 102d. All connection elements 200 depicted in FIG. 5 have the same profile, and are cut to different lengths to accommodate the desired lateral dimensions of the respective sandwich plate elements 100. These should not solely be seen as the floor and walls of a vehicle, but are merely an example of how the sandwich plate elements 100 can be used with the connection elements 200 to form a structure or chassis for a vehicle.

Figure 6:
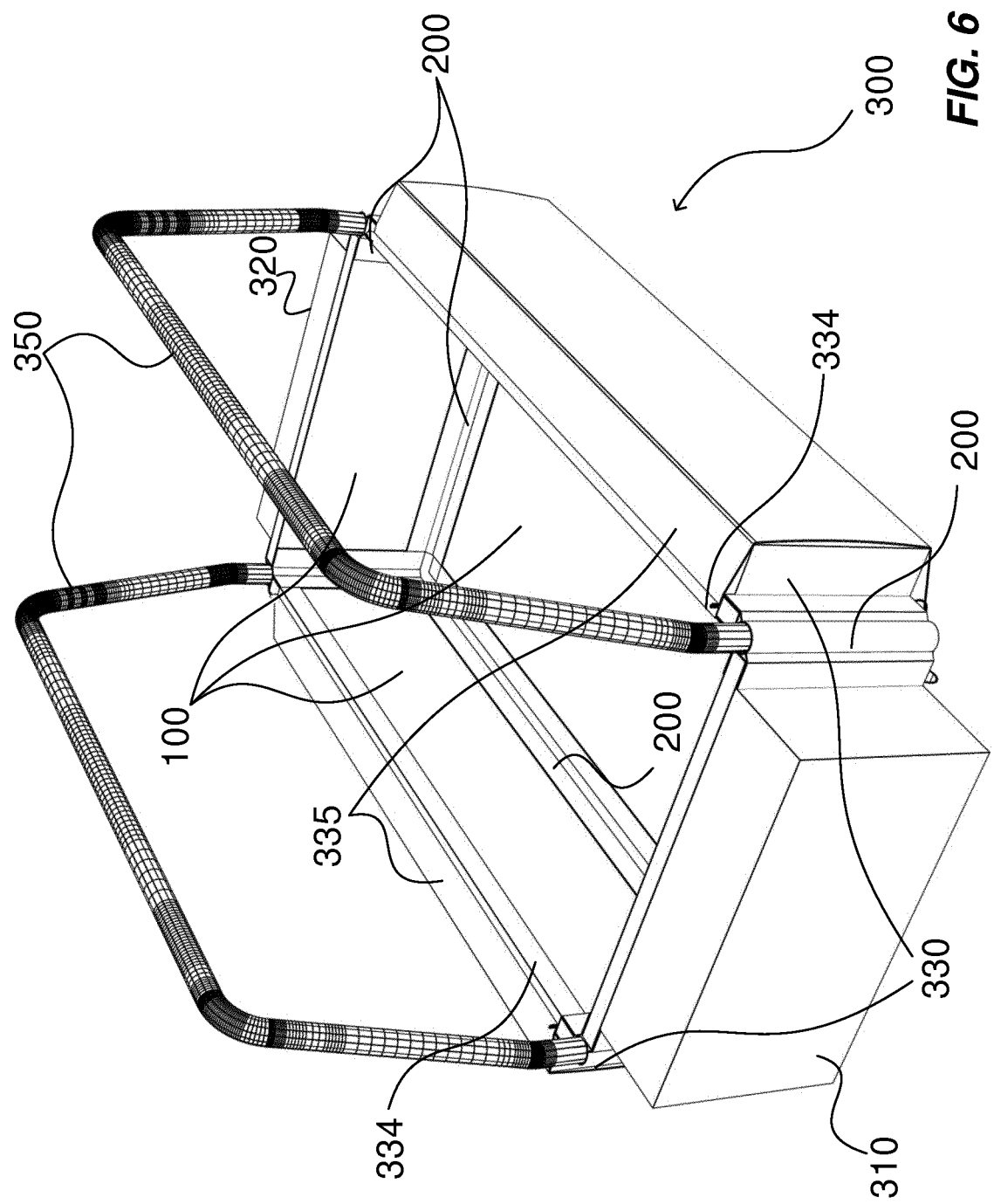
FIG. 6 illustrates a chassis with mounted energy absorption elements.

FIG. 6 shows a vehicle chassis 300 with auxiliary elements in the form of a front energy absorption element 310, a back energy absorption element 320, side energy absorption elements 330 and a roll cage 350. Other auxiliary elements are also possible, such as fuel tanks, integrated fuel tanks, batteries, headlights, suspension components and so forth. The energy absorption elements 310, 320, 330 depicted in FIG. 6 are of a light-weight compressible material, in particular stiff polymer foam, allowing some amount of energy from impacts to be absorbed instead of deforming an enclosed space of the chassis 300 which may carry passengers who may otherwise have been harmed to a greater extent by the collision. The energy absorption elements 310, 320, 330 may be attached to the chassis 300 in any suitable manner, preferably by an adhesive. The chassis 300 may comprise covering shells 335 forming a body or part of a body 335 over the chassis 300. The shells 335 forming the body or part of the body 335 may provide a vehicle comprising the chassis 300 with better aerodynamic properties or make it more attractive for a consumer. Moreover, the body 335 may protect other parts of the chassis 300 from external conditions, thereby reducing e.g. weather impact on the chassis 300 and its components. In other words, the shells 335 or body 335 may protect the insides of a vehicle comprising the chassis 300 from dirt or humidity as a result of outdoor use. Similar shells may of course also be mounted on the front or back energy absorption elements 310, 320 or anywhere on the chassis 300. The body 335 or part of the body 335 may be attached to the connection elements 200 of the chassis 300. The body 335 may be attached by adhesive means, separate mechanical fastening means such as screws or rivets or by an interlocking mechanism.

Figure 6A:
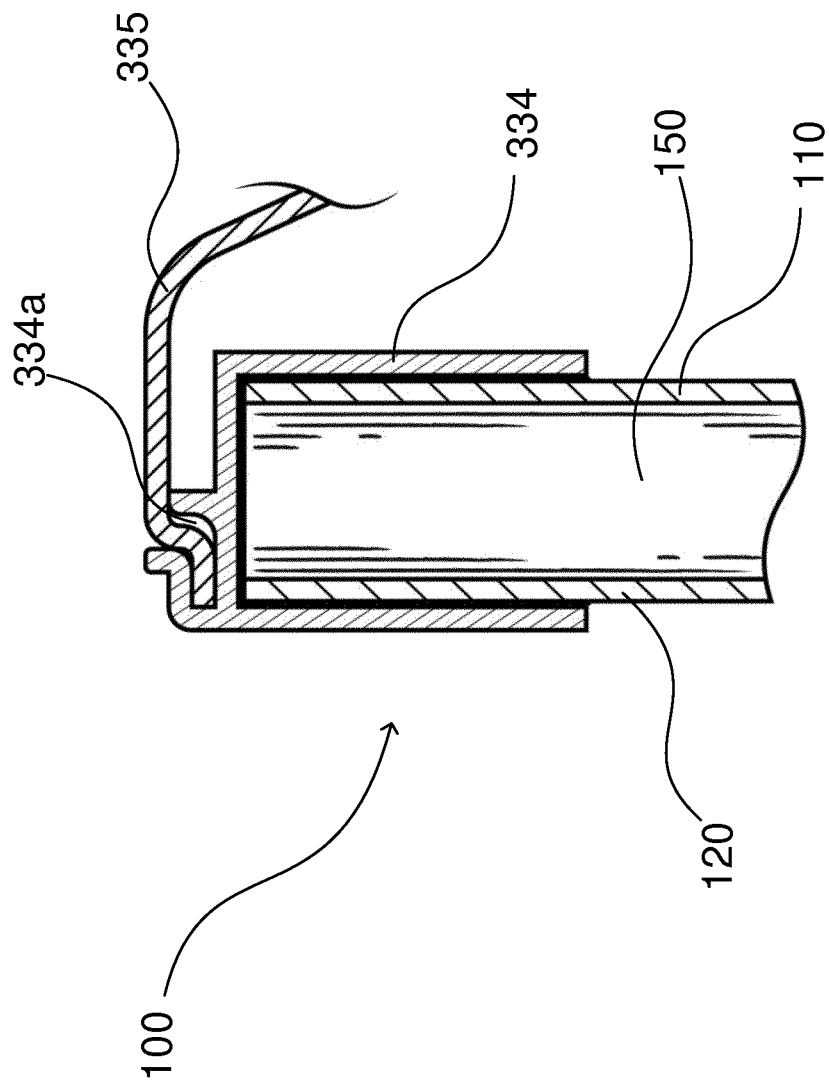

FIGS. 6a and 6b illustrates how shells 335 forming part of a body 335 or a complete body 335 may be fastened to a chassis 300.

In FIG. 6a and it is depicted how a shell 335 forming part of a body 335 is attached to a sandwich plate element 100 by means of a profile element 334 attached to the sandwich plate element 100. The profile element 334 may be formed using any of the techniques and materials discussed above in relation to the connection elements 200. The depicted profile element 334 of FIG. 6a is made of extruded aluminium. The shell 335 forming part of a body 335 is attached to the profile element 334 by being inserted into a recess 334a formed in the profile element 334. The shell 335 may be fastened in the recess 334a of the profile element 334 using any suitable technique, such as gluing, riveting or bolting to give a few non limiting examples. As an alternative, the shell 335 may only be inserted into the recess 334a of the profile element 334.

In FIG. 6b and it is depicted how a shell 335 forming part of a body 335 is attached to a sandwich plate element 100 by means of a profile element 334 attached to the sandwich plate element 100. The profile element 334 of FIG. 6b, like the profile element 334 of FIG. 6a, may be formed using any of the techniques and materials discussed above in relation to the connection elements 200. The depicted profile element 334 of FIG. 6b is made of a polymer based material. The shell 335 forming part of a body 335 is attached to the profile element 334 by being placed in contact with a flange portion 334b of the profile element 334 and subsequently clamped in place by a clamp member or clamp 333. The clamp 333 may for example be made of metal or any other suitable material. The clamp 333 may be designed to exert a compressive force on the flange portion 334b of the profile element 334 and the shell 335 forming part of the body 335. The shell 335 may in addition be fastened to the flange portion 334b of the profile element 334 using any suitable technique, such as gluing, riveting or bolting to give a few non limiting examples.

It is to be understood the fastening techniques illustrated in FIGS. 6a and 6b may be used to fasten a shell 335 forming part of a body 335 or a complete body 335 directly to connection elements 200 without the use of any additional profile elements 334. In this case, the connection elements 200 concerned may be provided with a recess or a flange of the types described above in relation to the profile elements 334 of FIGS. 6a and 6b. In other words, a shell 335 or shells 335 forming part of a body 335 or forming a body 335 may be fastened directly to connection elements 200 of a chassis 300 using the techniques described above and depicted in FIGS. 6a and 6b.

The roll cage 350 depicted in FIG. 6 is connected to the centre portion 230 of the connection elements 200. It is to be noted that the connection elements 200 depicted in FIG. 6 have a circular rather than trapezoidal centre portion 230. The central portion 230 of the connection elements 200 can also be used to route cables, hoses or to house sensors or other auxiliary elements of a vehicle as they define tunnels through the chassis 300.

Figure 7:
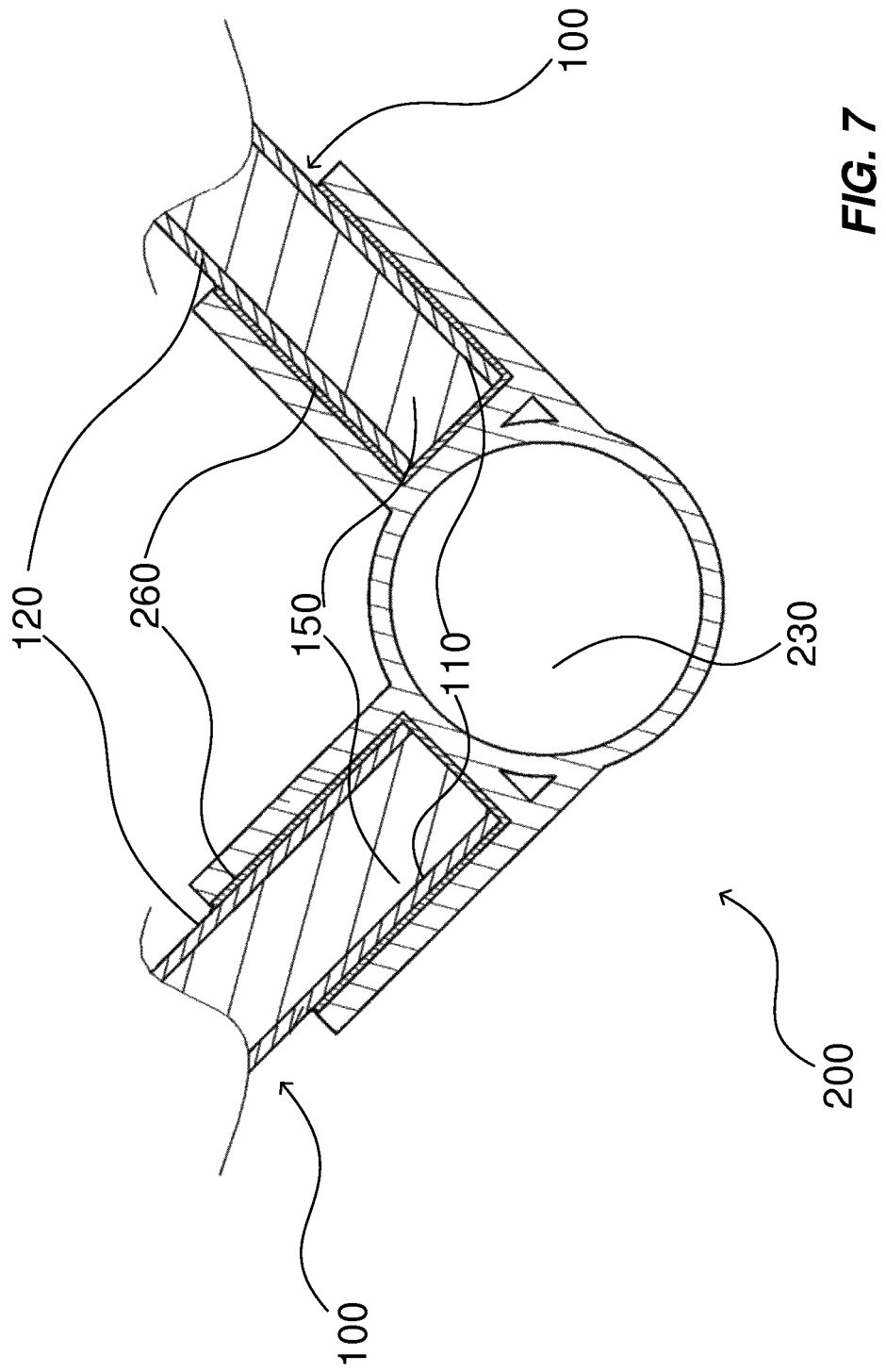
FIG. 7 illustrates a cross-section of a different connection element.

It is contemplated that there are numerous modifications of the inventive concept described herein, which are still within the scope of the invention as defined by the appended claims. For example, the central portion 230 of a connection element 200 may have a shape other than trapezoidal as described above in conjunction with FIG. 6. The central portion 230 may be round or circular, as illustrated in FIG. 7. Moreover, the central portion 230 may be oval, triangular or square shaped to give a few non limiting examples. The use of a round central portion may facilitate mounting of elements having a round or circular cross section as such elements may inserted into the void circular space of the central portion 230. This is illustrated in FIG. 6 where tubes of a circular cross section are used to form the roll cage 350.

The energy absorption elements 310, 320, 330 may be formed from metal or another hard material as lattices, thus comprising deformation zones for absorption of impact energy.

The connection elements 200 may comprise a mounting arrangement for connection of auxiliary elements or further elements pertaining to the chassis 300 or not pertaining to the chassis 300. The mounting arrangement may comprise a fastening member 240 such as a bolt, screw or rivet and holes 235 therefor, as illustrated in FIGS. 8 and 9.

Figure 8:
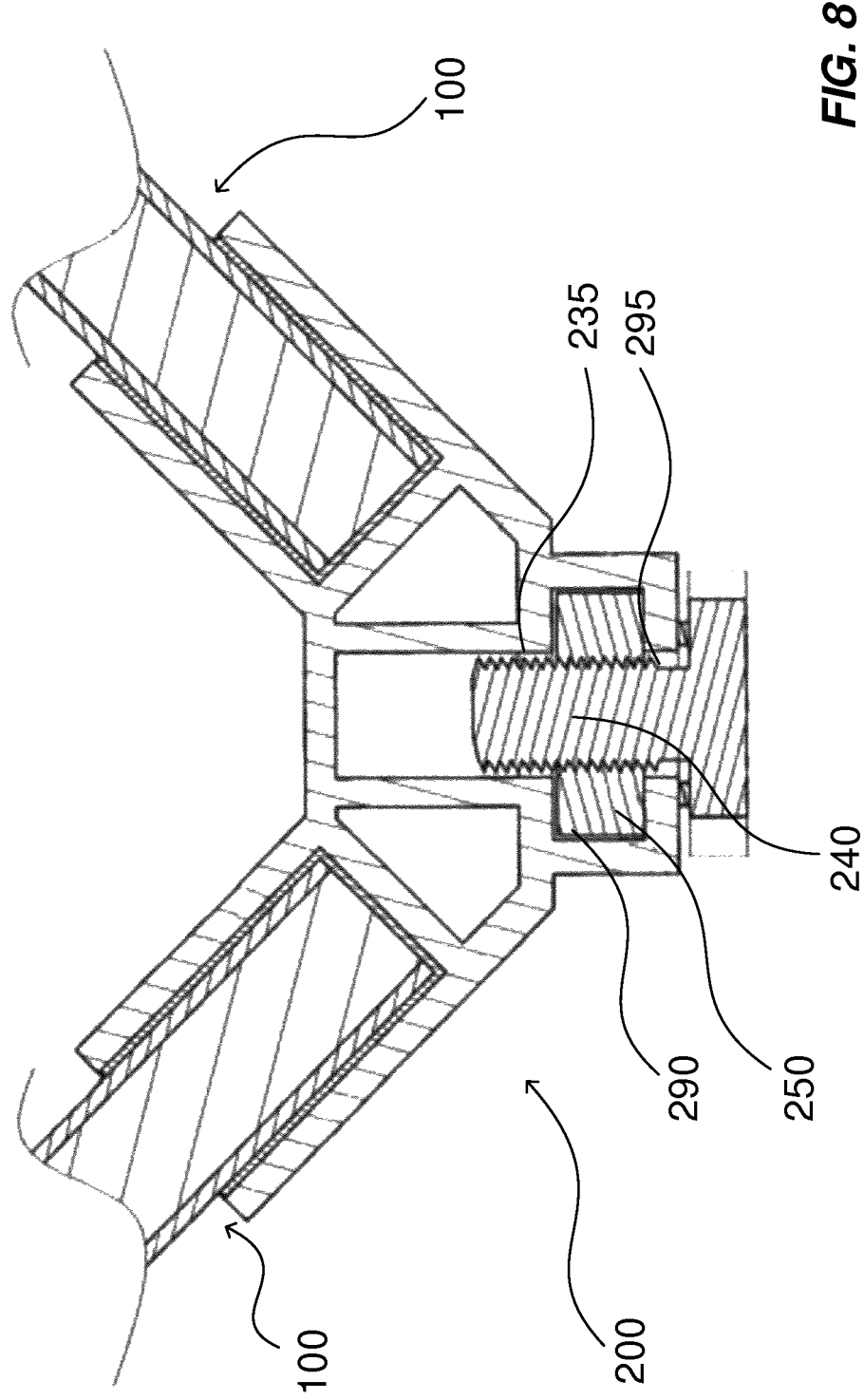
FIG. 8 illustrates a cross-section of a third kind of connection element with a bolt.

In FIG. 8, a connection element 200 is illustrated. The connection element 200 has been formed with an alcove 290. The alcove 290 and central portion 230 each have a through-going hole 235, 295, said through-going holes 235, 295 being aligned with each other. The connection element 200 also comprises a threaded element 250, adapted to receive a bolt 240. The bolt 240 may be any male fastening means, such as a screw or a rivet. The bolt 240 passes through both through-going holes 235, 295 and engages the threading in the threaded element 250 such that it, together with the connection element 200, counteracts movement of the threaded element 250 in any direction. The bolt 240 may be used to connect an auxiliary element such as a light, wheel suspension, door hinge or similar to the chassis 300 by way of the connection element 200. The threaded element 250 may be integrally formed with the connection element 200. However, the threaded element 250 may instead be connected with an auxiliary element as exemplified above and be adapted to be slid into the connection element 200 in a longitudinal direction normal to the plane of the figure, and fastened with the bolt 240 thereby.

Figure 9:
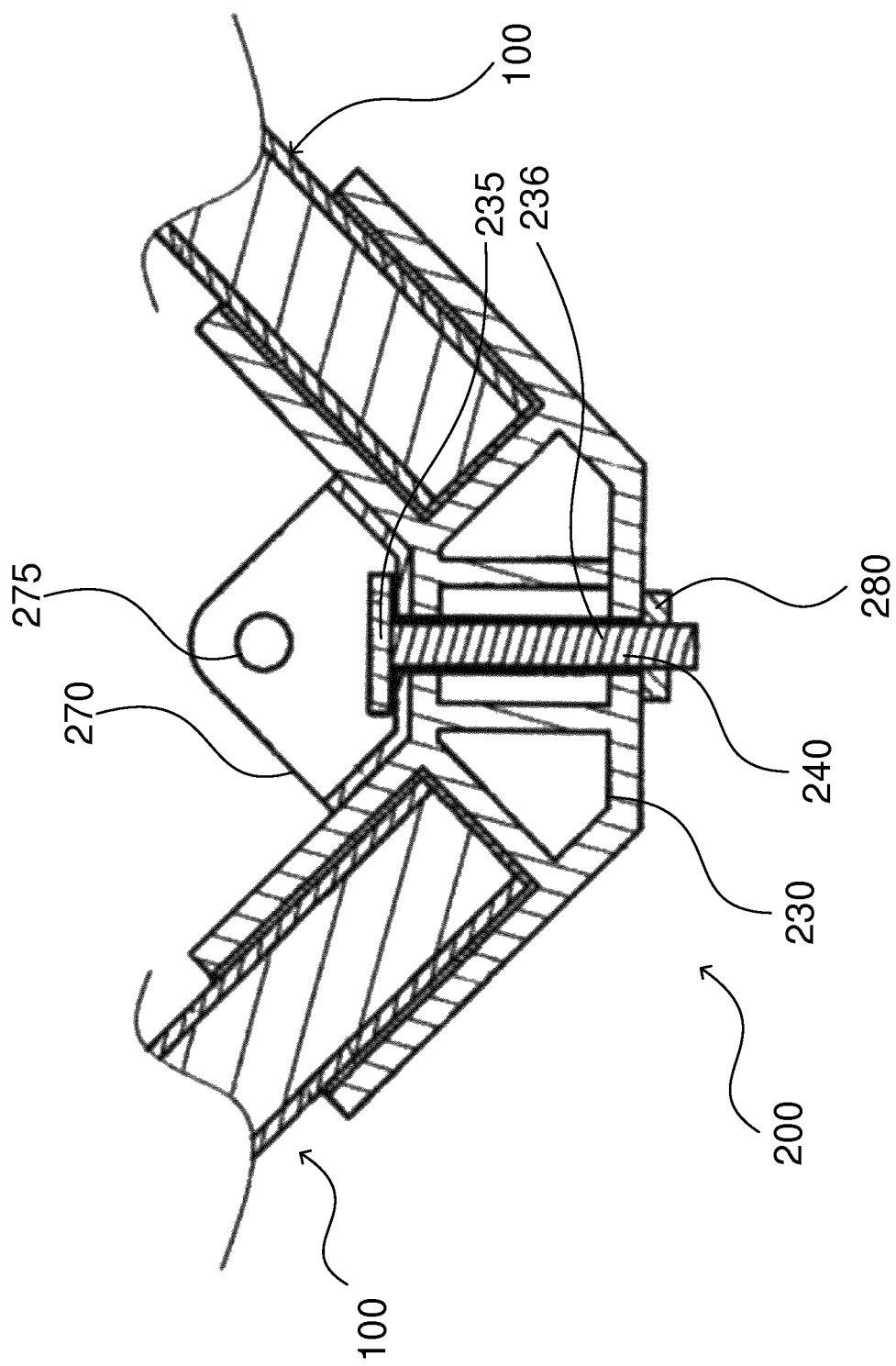
FIG. 9 illustrates a cross-section of a fourth kind of connection element with a bolt.

In FIG. 9, a connection element 200 is illustrated. The connection element 200 comprises two through-going holes 235, 236 through the central portion 230. The connection element 200 further comprises an ear 270, with a through-going hole 275. A bolt 240 is connected through both through-going holes 235, 236, and secured with a nut 280. The ear 270 may be integrally formed with the connection element 200, or held in place by the bolt 240. The nut 280 may be welded or otherwise fastened to the connection element 200. The connection element 200 and the nut 280 may be formed as a single body. The nut 280 can of course also be a free-standing nut 280. The bolt 240 can be used to connect auxiliary elements to the chassis 300 by way of the connection element 200, similarly to FIG. 8. The ear 270 may also be used to connect such auxiliary elements by way of its hole 275.

Figure 10:
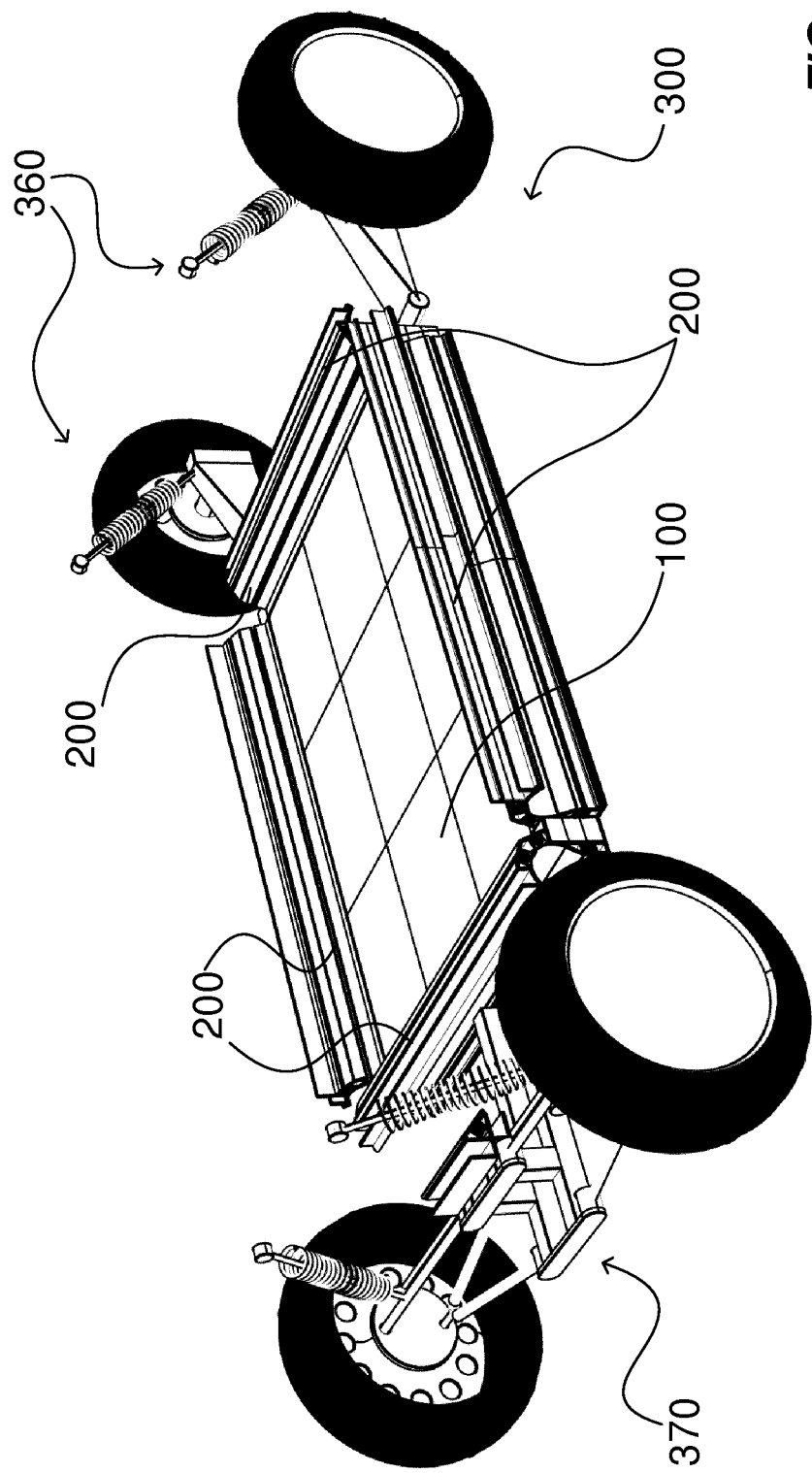
FIG. 10 illustrates a chassis for a road vehicle with auxiliary elements connected.

FIG. 10 illustrates a chassis 300 with auxiliary elements in the form of wheel suspensions 360 at the rear and a steering array 370 at the front. The auxiliary elements 360, 370 are connected to the chassis 300 by way of the connection elements 200 as described with reference to FIGS. 8 and 9, not shown. In this way, a vehicle may be easily formed or constructed by connecting sandwich plate elements 100 with connection elements 200 which also provide easily workable connection points for other parts of the vehicle. The chassis 300 may preserve the strength and stability of a monocoque chassis while being easier to manufacture and hence less expensive.

The present disclosure also relates to a corresponding method for assembling a chassis 300. Such a method may be any method wherein the parts described above, in particular the sandwich plate element 100 and the connection element 200, are connected in the way described above to form a chassis 300.

The inventive concept will now be further illustrated with a series of examples. It should be noted that these examples do not necessarily conform to the above disclosure, but should be viewed as illustrative clarifications thereof.

EXAMPLE 1

Chassis manufacture. In FIG. 1 is shown a rectangular bottom panel of polymer foam sandwiched between two sheets of a glass fibre reinforced thermoplastic polymer material. Rectangular profile joint mounting sections extend along the right and left lateral edges and the front and rear edges of the panel. At these sections profile joints for mounting right and left lateral panels and the front and rear panels are attached to the bottom panel (FIG. 4). The profile joints are of a length so as to extend short of a section at each corner of the bottom panel, which thus remains free. FIG. 2 illustrates a transverse section of a first variety of an extruded aluminium profile. Joints are made by a profile into sections of desired length. The profile has a central hollow trapezoid portion forming a channel and consists of a base section, a top section, and lateral sections. From the lateral sections extend in a perpendicular relationship outer and inner tongues forming rectangular slits for mounting of panels. Their width corresponds to that of the panels to be inserted into them or is slightly larger. FIG. 3 illustrates the profile of FIG. 2 with panels mounted in slits. In the mounting process two panels, one of which may be a bottom panel and the other one of right and left lateral panels or one of front and rear panels or, alternatively, one of right and left lateral panels and one of front and rear panels are inserted into slits and fixed therein. A most preferred fixture method is by gluing, in which a thin layer of adhesive is disposed between the inner walls of slits and the inserted terminal section of the respective panel. The adhesive may be applied to the inner walls of the tongues forming the slits only or also to the bottom of the slits, that is, by portions of lateral profile sections facing the slit. Alternatively, the adhesive may be applied via a separate, purpose made slit in the profile using pressurized glue.

The further mounting of the chassis can be carried out in different ways. One is by inserting left and right lateral panel cut to size into the upwardly facing slits of the lateral joints mounted to the bottom panel and inserting front and rear panels cut to size into the upwardly facing front rear profile joints mounted to the bottom panel, and fixing them in the slits by, for instance, gluing. In the next step corner profile joints of same length are inserted from above at the corners so as to receive edge portions of the lateral, front, and rear panels in their slits. The corner profile joints are of about the same length as the short sides of the lateral, front and rear panels.

The thus produced chassis of the invention is shown in FIG. 5. It can be alternatively produced by first joining the lateral, front and rear panels by means of the corner profile joints, then inserting the bottom edges of the rectangular assembly of joined lateral, front, and rear panels (not shown) into the upwardly facing slits of the profile joints attached to the bottom panel shown in FIG. 4.

The chassis be provided with lateral, front and/or rear impact energy absorption elements shown in FIG. 6. The energy absorption elements are of a light-weight compressible material, in particular a stiff polymer foam. In this context "compressible material" signifies a material that is not easily compressible but is sufficiently compressible to yield to an impact by a colliding structure such as a motor car sufficiently easy to dissipate the impact energy. Thereby the energy absorption element is protecting the rigid structure of the chassis from being damaged. An energy absorption element of the invention damaged in a collision can be exchanged for another at much lower cost that the cost of repairing an unprotected chassis of the invention damaged in such a collision. The absorption elements can be attached to the outer faces of the lateral, front and rear panels in any desired manner, in particular by gluing. In addition to their protective role they allow the motor car or other vehicle comprising the chassis to be designed in an attractive manner. For instance, they may be given a rounded profile hiding the rectangular box-like structure of the chassis. Or, as illustrated in FIG. 6, they may be covered by a shell of thermoplastic polymer material formed, in particular by vacuum forming, to a desired shape such as structures enclosing the lateral energy absorption elements. The purpose with the shell is to protect the energy absorption from weather and dirt. The shell, which can be coloured, should be light-weight and easy to clean. It does not contribute substantial torsional or bending rigidity to the motor car or other vehicle comprising the chassis of the invention.

EXAMPLE 2

First variety of profile joint. The profile joint of FIG. 2 can be varied in many ways. In a first variety of the joint shown in FIG. 7 the trapezoid central structure is substituted by a circular or tubiform structure comprising tongue bases extending in a tangential manner in an angle of 90°. The tongues extend in a perpendicular direction from the tongue bases. The lumen of the circular structure can be used for mounting external gear such as motor, suspension and wheels. A preferred manner of mounting external gear is by inserting coupling elements in form of steel rods or tubes into the lumen and fixing them there, which rods or tubes extend from one or both ends of the tubiform structure, thus are of a length greater than the length of the profile joint. It is, of course, possible to use the profile of FIG. 2 in a similar manner, the difference being that the insert into the trapezoid channel should preferably be of trapezoid or, less preferred, of rectangular form.

EXAMPLE 3

Second variety of profile joint. The profile joint illustrated in FIG. 8 in transverse section comprises a trapezoid central structure comprising top portion and lateral portions, from which tongues extend in a perpendicular direction forming slits in which panels are mounted and fixed with glue. In the trapezoid base is provided a central slit providing access into the lumen. Two L-formed, outwardly extending profile sections with their bases pointing towards each other are disposed laterally of the slit. They enclose a rectangular channel housing an insert of corresponding but slightly smaller rectangular section and of a length greater than the length of the profile joint thus extending from one or both ends of the joint. The insert is kept in place by one screw or several screws of same kind. The screw is inserted through the opening between the L-formed fingers and fixed in threaded bore of the insert, which is kept in place by being pressed against inner faces of the L-formed fingers.

EXAMPLE 4

Third variety of profile joint. The profile joint illustrated in FIG. 9 in transverse section comprises a trapezoid central structure comprising lateral slanting portions from which tongues extend in a perpendicular direction forming slits in which panels are mounted and fixed with glue. A bore disposed centrally in the trapezoid structure and extending perpendicularly to it through its outer base section and its inner top section houses a screw with a head and a nut, of which the head is disposed at the inside of the joint. The head of the screw holds a fastener disposed inside of the chassis in abutment a central part of the inner face of the joint. The fastener consists of a first portion which, in a mounted position extends perpendicularly to the bottom panel and which comprises a bore through which the screw passes, and of a second portion which extends perpendicularly in an inward direction from the lower end of the first portion and parallel with the bottom panel of a chassis to which it is mounted. The second portion comprises a through bore for mounting of gear primarily pertaining to the inside of the chassis.

EXAMPLE 5

Chassis provided with superstructure. The chassis of FIG. 6 is provided with a superstructure in form of a bow-like elements being attached to the chassis by insertion of their terminal portions in the upper circular openings of tubiform central sections of the second profile joints.

EXAMPLE 6

Chassis provided with gear. The chassis of FIG. 10 comprises a bottom panel of a layered material comprising a thick layer (thickness of about 10 cm) of stiff polymer foam sandwiched between thinner outer layers (thickness of about 3 mm) of fibre-reinforced polymer sheets. Left and right aluminium profiles are attached to bottom panel at the left and right edges, respectively, thereof, while front and rear profiles are attached to the bottom panel at the front and rear edges thereof.

The invention claimed is:
1. A chassis for a vehicle, the chassis comprising a plurality of sandwich plate elements and a plurality of connection elements in a configuration that is not a body-on-frame chassis, wherein
the sandwich plate elements each comprise a plate core and a first and second plate skin, wherein the first plate skin is arranged to at least partly cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being opposite to each other, and wherein
each connection element comprises two or more recesses, each recess comprising a first and a second inner surface and being adapted to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess;
wherein connection of a plurality of the sandwich plate elements to each of a plurality of connection elements forms said chassis; and
wherein the chassis further comprises auxiliary elements, said auxiliary elements being connected to the connection elements of the chassis.

2. The chassis according to claim 1, wherein the edge portions received in the recesses are bonded to the first and second inner surfaces of each of said recesses by an adhesive.

3. The chassis according claim 1, wherein the first and second major outer surfaces of the sandwich plate elements are at least partially parallel.

4. The chassis according to claim 1, wherein the chassis further comprises energy absorption elements.

5. The chassis according to claim 4, wherein the energy absorption elements are arranged at least partially at a front and/or a back of the chassis.

6. The chassis according to claim 4, wherein the energy absorption elements are arranged at least partially at a left and/or a right side of the chassis.

7. The chassis according to claim 1, wherein the first and second plate skin of a sandwich plate element is made from a fiber-reinforced polymer material.

8. The chassis according to claim 1, wherein the plate core of a sandwich plate element is made from a polymeric foam.

9. The chassis according to claim 1, wherein a connection element is made from metal.

10. The chassis according to claim 1, wherein a connection element is made from a polymer-based material.

11. The chassis according to claim 9, wherein said connection element is made by an extrusion process.

12. A vehicle comprising a chassis according to claim 1.

13. A method for forming a chassis for a vehicle in a configuration that is not a body-on-frame chassis, comprising the steps of:
   providing a plurality of sandwich plate elements, each plate element comprising a plate core and a first and second plate skin, wherein the first plate skin is arranged to at least partly cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being opposite to each other;
   providing a plurality of connection elements, each connection element comprising two or more recesses, each recess comprising a first and a second inner surface and being adapted to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess;
   arranging an edge portion of each of the plurality of sandwich plate elements into a recess of one of the plurality of connection elements;
   wherein connection of a plurality of the sandwich plate elements to each of a plurality of connection elements forms said chassis; and
   providing auxiliary elements; and
   connecting said auxiliary elements to the connection elements of the chassis.

14. A kit of parts for assembling a chassis for a vehicle in a configuration that is not a body-on-frame chassis, the kit comprising a plurality of sandwich plate elements a plurality of connection elements and auxiliary elements, wherein
   the sandwich plate elements each comprise a plate core and a first and second plate skin, wherein the first plate skin is arranged to at least partially cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being at least partially opposite to each other, and wherein
   each connection element comprises two or more recesses, each recess comprising a first and a second inner surface and being adapted to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess;
   wherein
   the auxiliary elements are adapted to be connected to the connection elements of the chassis;
   and wherein connection of a plurality of the sandwich plate elements to each of a plurality of connection elements forms said chassis.

15. The chassis according to claim 1, wherein the auxiliary elements are selected from the group consisting of one or more of fuel tanks, lights, engine mounts, energy absorption elements, roll cages, batteries, headlights, suspension components, door hinges, and steering arrays.

16. The method according to claim 13, wherein the auxiliary elements are selected from the group consisting of one or more of fuel tanks, lights, engine mounts, energy absorption elements, roll cages, batteries, headlights, suspension components, door hinges, and steering arrays.

17. The kit according to claim 14, wherein the auxiliary elements are selected from the group consisting of one or more of fuel tanks, lights, engine mounts, energy absorption elements, roll cages, batteries, headlights, suspension components, door hinges, and steering arrays.

* * * * *